United States Patent Office 3,705,250
Patented Dec. 5, 1972

3,705,250
PSEUDOTHIOUREAS AND SALTS THEREOF AS VIRUCIDES
Charles Frank Hinz, Stamford, Conn., assignor to American Cyanamid Company, Stamford, Conn.
No Drawing. Filed Dec. 3, 1969, Ser. No. 881,848
Int. Cl. A01n 9/12, 9/20
U.S. Cl. 424—322          3 Claims

ABSTRACT OF THE DISCLOSURE

A method of inactivating lipophilic viruses by contacting the virus with a compound of the formula:

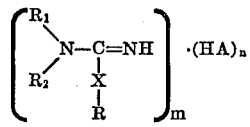

wherein X is sulfur or oxygen, R is a straight chain aliphatic hydrocarbon radical of 8 to 18 carbon atoms, $R_1$ and $R_2$ are individually hydrogen or methyl, HA is an anionic salt forming group, $n$ is 0 or 1, $m$ is 1 when $n$ is 0, and $m$ is an integer of 1 to 3 when $n$ is 1 depending on the number of protons of HA partaking in salt formation.

---

This invention relates to the use of certain pseudoureas, pseudothioureas, and active salts thereof as virucides.

Viruses are not homogeneous in their susceptibility to given bactercides and the virucidal activity of a given bactericide cannot be reasonably predicted. Therefore, known bactericides are not employed under normal circumstances as virucides.

The virucidal compounds of the present invention may be represented by the following formula:

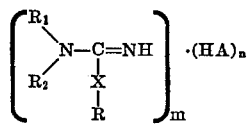

wherein X is oxygen or sulfur, R is a straight chain aliphatic hydrocarbon radical of 8 to 18 carbon atoms, inclusive, $R_1$ and $R_2$ are individually selected from the group consisting of hydrogen and methyl, HA is an anionic salt forming group, $n$ is 0 or 1, $m$ is 1 when $n$ is 0, and $m$ is an integer of 1 to 3 when $n$ is 1 depending upon the number of protons of HA partaking in salt formation. When X is oxygen, the compounds are psuedoureas and when X is sulfur, the compounds are psuedothioureas. When $n$ is 0, the compounds are in the free base form and when $n$ is 1, the compounds are in salt form. It has been found that the properties of the pseudoureas and the psuedothioureas as regards virucidal activity are similar and hence such properties are not influenced by whether X is oxygen or sulfur.

With regard to the number of carbon atoms in the aliphatic hydrocarbon radical designated as R in the formula above, it is preferred that the number be in the range of 8 to 18 in order to obtain effective virucidal activity. Compounds having the R substituent both below and above the range specified appear to have less virucidal activity at the use levels contemplated. Also, where the R substituent is a branched chain, activity is less at the use levels contemplated than straight chained substituents. More preferred compounds are those in which the number of carbon atoms in the aliphatic hydrocarbon radical designated as R is between 10 and 16.

Any additional substitution on the urea structure should be limited in order to maintain effective virucidal activity at the use levels contemplated. Thus for the practical utility indicated, additional substitution on the urea structure, designated $R_1$ and $R_2$ in the above formula, should not be present or should be limited to methyl groups.

Acids used to form the salts include both organic and inorganic acids, whether monobasic or polybasic, so long as the acid employed does not interfere with virucidal activity. Effective acids include, but are not limited to the following: Acetic, propionic, butyric, valeric, caproic, caprylic, lauric, capric, lactic, malic, maleic, phthalic (tere-, iso-), benzoic, naphthoic, carbonic, bicarbonic, boric, hydrochloric, nitric, phosphoric, 2-ethylhexanoic, and sulfuric. Pseudoureas, pseudothioureas, and salts thereof are known and other uses for at least some of the compounds effective in the present process are disclosed. See for example U.S. Pat. 2,980,578 issued Apr. 18, 1961 to Abramitis et al.

The process of the present invention is based on the use of the aforementioned compounds which are effective virucidals at concentrations as low as 50 parts per million. The compounds used in the process of the present invention are more effective against many lipophilic viruses than are the guanidine salts such as those disclosed in U.S. Pat. 3,436,461 issued Apr. 1, 1969 to Scotti. At the same time the compounds of this invention exhibit lower cell culture toxicity than the guanidine salts. This result is completely unexpected and enables the compounds useful in the process of the present invention to be employed effectively at lower concentrations than required for the guanidine salts. The lower effective use concentration and the lower compound toxicity combine to provide a highly significant increase in the margin of safety against vertebrate toxicity due to accidental contact with the sanitizing agent. Although compounds useful in the process of the present invention are effective at concentrations as low as 50 parts per million, the added safety margin with respect to vertebrate toxicity provides for safe use at considerably higher concentrations. Therefore, to insure effectiveness in virucidal actitvity, it is preferred to employ the pseudoureas, pseudothioureas, and active salts thereof at concentrations in the range of 200–500 parts per million or higher.

The preferred compounds for use in the process of the present invention are those of the formula given above which are wholly or partially soluble in water or alcohols or admixtures, since these solvents are the usual application media. Of the compounds included in the formula, dodecylpseudourea acetate and N,N-dimethyldodecylpseudourea dihydrogen phosphate are most preferred because of their effectiveness, availability, and low cost. Typical alcohols used alone or in admixture with water as solvent media are the water-miscible alcohols such as ethanol and isopropanol. In addition, the composition may also contain suitable surfactants, as well as phenolic type germicides.

In addition to the advantages of lower effective compound use concentration and lower compound toxicity provided by the present process compared to the prior art process cited, the process of the present invention offers other advantages. A particular advantage is realized since the present invention provides an inexpensive expedient for use in homes, offices, and factories to prevent the spread of viral diseases. An added advantage resides in the fact that the compositions used in the process of the present invention do not possess the noxious odors of many of the known sanitizing solutions.

In addition to sanitizing areas to control the spread of viral contamination, a further application resides in the incorporation of the compounds of the present invention in apparel, linens, and the like. Moreover, as a consequence of the cationic nature of the pseudoureas, pseudothioureas, and active salts thereof, they are substantively adsorbed on anionic materials including cellulosic materials such as paper fibers, cloth, and other products. The addition of said compounds to a suspension of paper-making fibers gives an adsorbed effective content of sanitizing agent in the paper thus formed when employed at concentrations of 150–500 parts per million based on the weight of paper-making fibers. Thus, the incorporation of said compounds in disposable paper such as dental bibs, towels, and the like is effected as the paper is formed and eliminates the necessity of subsequent treatment which can be damaging to disposable paper. The compounds of the present invention may be incorporated in other products and antiviral systems employing a concentration of 150–500 parts per million, or formulated with inert carriers such as clay. In addition, the compounds may be formulated as concentrates, which are diluted to the proper concentration prior to use. A concentrate containing 10% of active compound in an aqueous alcoholic solvent is preferred.

Viruses controlled by application of the pseudoureas, pseudothioureas, and active salts thereof are of the lipophilic type as defined by Noll and Younger, Virology, 8:319–343 (1959). There are viruses which combine with lipids such as cholesterol. The viruses which do not readily combine with lips are called hydrophilic viruses. Examples of hydrophilic viruses are polioviruses, Coxsackie, and Echo viruses. Examples of lipophilic viruses are the myxoviruses (e.g. influenza A, influenza B, Asian influenza, parainfluenza type 3), herpes viruses (e.g. herpes simplex) pox viruses (e.g. vaccinia), and Arboviruses (e.g. encephalitis viruses).

A distinction in activity of the pseudoureas, pseudothioureas, and active salts thereof and that of the alkyl guanidine salts disclosed in U.S. Pat. 3,436,461 issued Apr. 1, 1969 to Scotti is illustrated in connection adenovirus type 3. Although adenoviruses do not have lipid envelopes, they are classified as lipophilic because they are absorbed with lipids. Although the compounds of the present invention are generally active at lower concentrations than the alkyl guanidine salts against most true lipophilic viruses, they are only slightly active against adenovirus type 3 while the alkyl guanidine salts completely inactivate this virus type. Thus, it is quite unexpected and highly surprising that the spectrum of antiviral activity should differ among compound types as indicated.

It is significant that Echovirus 11, a hydrophilic virus, is not inactivated by the pseudoureas, pseudothioureas, and salts thereof. While the mechanism by which the compounds of the present invention exhibit antiviral activity is not fully understood, it is believed that the long chain hydrocarbon of the effective pseudoureas, pseudothioureas and salts thereof, being lipophilic, promotes penetration through the lipid envelope of lipophilic viruses, thereby facilitating contact with the virus. In the case of Echovirus 11, the long chain hydrocarbon radical of the effective pseudoureas, pseudothioureas, and salts thereof apparently is incompatible with the virus and cannot penetrate the viral cell wall.

The following examples are provided for illustrative purposes and include particular features of the invention.

EXAMPLE 1

Solutions in water at 400 parts per million are separately prepared of dodecylpseudourea acetate and dodecyldimethylpseudourea dihydrogen phosphate. Solution is facilitated by employing initially warm distilled water, i.e. at 45° C.

For comparative purposes a 400 parts per million (p.p.m.) solution of dodecylguanidine hydrochloride is also prepared. This solution is obtained by dilution with distilled water of a stock solution of 35% solids containing 6% of isopropanol and the balance water.

In a direct contact test, 0.5 milliliter of influenza A virus is diluted with 4.5 milliliters of the solutions prepared above in separate runs. The resulting solutions are then held at 22° C. for ten minutes. Serial dilutions are then made for inoculation into rhesus monkey kidney cultures. The test is read by hemadsorption. As a control, 0.5 milliliter of the virus is diluted in 4.5 milliliters Earle's lactalbumin hydrolysate medium and treated as just described. In the hemadsorption test, the cell culture tubes, three days after inoculation, are washed twice with 1.0 milliliter phosphate buffered saline (PBS). One milliliter of 0.4% guinea pig erythrocytes is added to each tube. The tubes are then incubated 20 minutes at 4° C. and washed with 1 milliliter PBS. The erythrocytes adsorb to the monkey kidney cells that are infected with influenza.

The results are tabulated in Table I below:

TABLE I

| | Virus potency (log $TCID_{50}$/ml.)[4] |
|---|---|
| Virus control | 6.0 |
| DPA [1] | <2.2 |
| DDPHP [2] | <2.2 |
| Comparative DGH [3] | <3.2 |

[1] DPA=dodecylpseudourea acetate.
[2] DDPHP=dodecyldimethylpseudourea dihydrogen phosphate.
[3] DGH=dodecylguanidine hydrochloride (comparative compound).
[4] $TCID_{50}$/ml.=tissue culture infective dosage per milliliter at 50% end-point, determined by method of Reed and Muench, American Journal of Hygiene, volume 27, May 1938, pages 493–497.

DPA and DDPHP are toxic through $10^{-1}$ virus dilution while DHG is toxic through $10^{-2}$ virus dilution.[1] All virucides completely inactivate inflenza A virus within limits of the test.

The results obtained indicate the greater potency of the compounds of the present invention compared to the alkylguanidine salt and, at the same time, the lower toxicity of the compounds of the present invention compared to the alkylguanidine salt.

EXAMPLE 2

Following the procedure of Example 1, 400 p.p.m. solutions of dodecylpseudourea acetate and dodecyldimethylpseudourea dihydrogen phosphate are prepared for testing of activity against herpes simplex virus.

The comparative compound is dedecylguanidine acetate (DGA) also at 400 p.p.m. in water.

In a direct contact test, 0.5 millimeter of the virus is diluted in 4.5 milliliters of the solutions prepared above in separate runs. The resulting solutions are then held at 22° C. for 10 minutes. Serial dilutions are then made for inoculation into BS–C–1 cell cultures (African green monkey kidneys). The test is read by viral cytopathology. As a control, 0.5 milliliter of the virus is diluted with 4.5 milliliters Earle's lactalbumin hydrolysate medium and treated as just described.

The results of virus potency and toxicity are reported in Table II below.

TABLE II

| | Virus potency (log $TCID_{50}$/ml.) |
|---|---|
| Virus control | 6.9 |
| DPA | <3.2 |
| DDPHP | <3.2 |
| Comparative DGA | <4.2 |

DPA and DDPHP are toxic through $10^{-2}$ virus dilution while DGA is toxic through $10^{-3}$ virus dilution. All virucides completely inactivate Herpes Simplex within the limits of the test.

The results obtained again indicate the greater potency and lower toxicity of the compounds of the present invention compared to the alkylguanidine salt.

EXAMPLE 3

Following the procedure of Example 1, 400 p.p.m. solutions of dodecylpseudourea acetate and dodecyldimeth- ---
[1] Toxicity is with respect to the cell culture at lowest dilution.

ylpseudourea dihydrogen phosphate are prepared for testing of activity against para influenza 3 virus.

The comparative compound is dodecylguanidine acetate (DGA) also at 400 p.p.m. in water.

The testing is carried in a manner identical to that of Example 1, the test differing only in the strain of virus employed. The test is read both by viral cytopathology and hemadsorption which produce the same results.

The test results are given in Table III below.

TABLE III

| | Virus potency (log $TCID_{50}$/ml.) |
|---|---|
| Virus control | 4.2 |
| DPA | <2.2 |
| DDPHP | <2.2 |
| Comparative DGA | <3.2 |

DPA and DDPHP are toxic through the $10^{-1}$ virus dilution while DGA is toxic through the $10^{-2}$ virus dilution. All virucides completely inactivate para influenza 3 virus within the limits of the test.

The results obtained again indicate the greater potency and lower toxicity of the compounds of the present invention compared to the alkylguanidine salt.

EXAMPLE 4

Following the procedure of Example 1, 400 p.p.m. solutions of dodecylpseudourea acetate and dodecyldimethylpseudourea dihydrogen phosphate are prepared for testing against influenza B virus.

The comparative compound is dodecylguanidine acetate (DGA) also at 400 p.p.m. in water.

The testing is carried out in a manner identical to that of Example 1, the test differing only in the strain of virus employed.

The test results are given in Table IV below.

TABLE IV

| | Virus potency (log $TCIP_{50}$/ml.) |
|---|---|
| Virus control | 5.2 |
| DPA | <2.2 |
| DDPHP | <2.2 |
| Comparative DGA | <3.2 |

DPA and DDPHP are toxic through $10^{-1}$ virus dilution while DGA is toxic through $10^{-2}$ virus dilution.

The results obtained again indicate the greater potency and lower toxicity of the compounds of the present invention compared to the alkylguanidine salt.

EXAMPLE 5

Following the procedure of Example 1, 400 p.p.m. solutions of dodecylpseudourea acetate and dodecyldimethylpseudourea dihydrogen phosphate are prepared for testing against adenovirus type 3.

The comparative compound is dodecylguanidine acetate (DGA) also at 400 p.p.m.

The testing is carried out in a manner identical to that of Example 1, the test differing only in the strain of virus employed and in reading the result by viral cytopathology.

The test results are given in Table V below.

TABLE V

| | Virus potency (log $TCID_{50}$/ml.) |
|---|---|
| Virus control | 5.4 |
| DPA | 4.7 |
| DDPHP | 4.7 |
| Comparative DGA | <3.2 |

The results show that dodecylpseudourea acetate and dodecyldimethylpseudourea dihydrogen phosphate have very slight activity against adenovirus type 3 while dodecylguanidine acetate produces complete inactivation within the limits of the test. It is quite surprising that the pseudourea compounds should be inactive against this virus strain in view of the activity of the alkylguanidine salt.

COMPARATIVE EXAMPLE

Following the procedure of Example 1, 400 p.p.m. solutions of dodecylpseudourea acetate, dodecyldimethylpseudourea dihydrogen phosphate, and dodecylguanidine are prepared for testing against Echovirus 11.

The testing is carried out as in Example 1, the test differing only in the strain of virus employed and in reading the result by viral cytopathology.

The results are that more of the virucides are active against Echovirus 11.

These results indicate that the virucides of the present invention are ineffective against lipophilic viruses.

EXAMPLE 6

Following the procedure of Example 1, a number of compounds of the present invention are tested for virus potency against various viruses. In each instance the compounds demonstrate a virucidal effect substantially similar to dodecylpseudourea acetate. The salts tested and the virus strain tested against are given in Table VI below.

TABLE VI

| Compound: | Virus strain inactivated |
|---|---|
| Octylpseudourea propionate | Influenza A. |
| Octylpseudothiourea benzoate | Herpes simplex. |
| Nonylpseudourea carbonate | Parainfluenza 3. |
| Nonylpseudothiourea lactate | Influenza B. |
| Decylpseudourea nitrate | Influenza A. |
| Decyldimethylpseudothiourea hydrochloride | Herpes simplex. |
| Tetradecylpseudourea acetate | Parainfluenza 3. |
| Di(hexdecylpseudourea) sulfate | Influenza B. |
| Octadecylpseudourea acetate | Influenza A. |
| Octylpseudourea | Do. |
| Octylpseudothiourea | Do. |

The results demonstrate additional lipophilic virucides of the present invention.

EXAMPLE 7

The following illustrates the manufacture of anti-virucidal paper resulting from the presence thereon of pseudourea and pseudothiourea salts according to the present invention.

Aliquots are taken from an aqueous neutral suspension of well-beaten cellulose papermaking fibers at a consistency of 0.6% and to these are respectively added a sufficient amount of 10% by weight solutions of (1) n-Decylpseudourea hydrochloride
(2) n-Dodecylpseudourea nitrate
(3) n-Dodecylpseudothiourea acetate
(4) n-Hexadecylpseudourea acetate to provide 500 parts per million of the compounds based on the dry weight of the fibers. The pH of the aliquots is then adjusted to 6 and the suspensions are gently stirred for a minute to permit the compounds to be adsorbed by the fibers.

The resulting suspensions are formed into waterlaid webs on a laboratory handsheet machine and dried at 190° F. The resulting sheets then tested for virucidal activity and each sheet showed excellent response in controlling virus activity.

I claim:
1. A method of controlling a lipophilic virus on areas and products contaminated therewith which comprises contacting said virus with an effective amount of a compound of the formula $$\left[ \begin{array}{c} R_1 \\ \phantom{R}\diagdown \\ R_2 \diagup \end{array} N-C=NH \atop \begin{array}{c} | \\ X \\ | \\ R \end{array} \right]_m \cdot (HA)_n$$

wherein X is sulfur or oxygen, R is a straight chain aliphatic hydrocarbon radical of 8 to 18 carbon atoms, $R_1$ and $R_2$ are individually hydrogen or methyl, HA is an anionic salt forming group, $n$ is either 0 or 1, $m$ is 1 when $n$ is 0, and $m$ is as integer of 1 to 3 when $n$ is 1 to inactivate said virus.

2. A method for controlling viruses on cellulosic material according to claim 1 wherein the R group of said compound has between 10 and 16 carbon atoms.

3. The method of claim 1 wherein said compound is selected from the group consisting of dodecylpseudourea acetate, dodecylpseudourea hydrochloride, dodecylpseudourea nitrate, dodecyldimethylpseudourea dihydrogen phosphate, and dodecylpseudothiourea acetate.

References Cited

UNITED STATES PATENTS

| | | | |
|---|---|---|---|
| 2,774,706 | 12/1956 | Hackmann et al. | 424—316 |
| 2,980,578 | 4/1961 | Abramitis et al. | 424—326 |
| 3,268,392 | 8/1966 | Gilbert | 424—326 |
| 3,436,461 | 4/1969 | Scotti | 424—326 |

OTHER REFERENCES

Hardmaw et al., Papermaking Practice, University of Toronto Press, 1961, pp. 321 and 322.

JEROME D. GOLDBERG, Primary Examiner

V. D. TURNER, Assistant Examiner

U.S. Cl. X.R.

117—138.5